(12) United States Patent
Mazzocchi et al.

(10) Patent No.: US 8,181,987 B2
(45) Date of Patent: May 22, 2012

(54) AIR BAG DEPLOYMENT DOOR WITH FORCE TRANSMITTING HINGE

(75) Inventors: Nicholas A. Mazzocchi, Ann Arbor, MI (US); Kenneth J. Kwasnik, Shelby Township, MI (US); Brian C. Slane, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 12/824,198

(22) Filed: Jun. 27, 2010

(65) Prior Publication Data

US 2011/0316262 A1    Dec. 29, 2011

(51) Int. Cl.
*B60R 21/205*    (2011.01)
*B60R 21/215*    (2011.01)

(52) U.S. Cl. .................. 280/728.3; 280/728.2; 280/732
(58) Field of Classification Search ............... 280/728.2, 280/728.3, 732
See application file for complete search history.

(56) References Cited

U.S. PATENT DOCUMENTS

| | | | |
|---|---|---|---|
| 6,076,851 A | 6/2000 | Davis, Jr. et al. | |
| 6,089,642 A * | 7/2000 | Davis et al. ..................... | 296/70 |
| 6,378,894 B1 | 4/2002 | Trevino et al. | |
| 6,467,801 B1 | 10/2002 | Preisler et al. | |
| 6,595,543 B2 * | 7/2003 | Desprez ..................... | 280/728.3 |
| 6,601,870 B2 * | 8/2003 | Suzuki et al. ............... | 280/728.3 |
| 7,007,970 B2 * | 3/2006 | Yasuda et al. ............... | 280/728.3 |
| 7,093,849 B2 * | 8/2006 | Nishijima et al. .......... | 280/728.3 |
| 7,152,872 B2 * | 12/2006 | Fujii .......................... | 280/728.3 |
| 7,178,825 B2 | 2/2007 | Fujii et al. | |
| 7,380,814 B2 | 6/2008 | Preisler | |
| 7,425,018 B2 * | 9/2008 | Suwama et al. ........... | 280/728.3 |
| 7,556,285 B1 * | 7/2009 | Hayashi ..................... | 280/728.3 |
| 7,658,404 B2 * | 2/2010 | Sadano et al. ................ | 280/732 |
| 7,665,758 B2 * | 2/2010 | Hayashi ..................... | 280/728.3 |
| 7,740,269 B2 * | 6/2010 | Kang .......................... | 280/728.3 |
| 7,744,115 B2 * | 6/2010 | Kanno ......................... | 280/728.3 |
| 7,784,820 B2 * | 8/2010 | Mazzocchi et al. ......... | 280/728.3 |
| 7,793,975 B2 * | 9/2010 | Fukawatase et al. ...... | 280/743.1 |
| 7,828,323 B1 * | 11/2010 | Mazzocchi et al. ........... | 280/732 |
| 7,887,087 B2 * | 2/2011 | Mazzocchi et al. ........ | 280/728.3 |
| 2002/0003343 A1 * | 1/2002 | Kansteiner ................. | 280/728.3 |
| 2005/0269804 A1 * | 12/2005 | Yamada et al. ............ | 280/728.3 |
| 2006/0033313 A1 * | 2/2006 | Horiyama .................. | 280/728.3 |
| 2007/0200318 A1 * | 8/2007 | Kamiya ..................... | 280/728.3 |
| 2010/0045005 A1 | 2/2010 | Augustyniak | |
| 2010/0109296 A1 | 5/2010 | Mazzocchi et al. | |
| 2010/0109297 A1 | 5/2010 | Mazzocchi et al. | |

* cited by examiner

*Primary Examiner* — Joseph Rocca
*Assistant Examiner* — Laura Freedman
(74) *Attorney, Agent, or Firm* — Gregory P. Brown; MacMillan, Sobanski & Todd, LLC

(57) ABSTRACT

An air bag deployment apparatus is provided for use in an air bag deployment system of an automotive vehicle. The apparatus has a support base for attachment to a rear surface of an occupant facing substrate. A door support panel has upper and lower surfaces and four side edges for attachment to the rear surface of the substrate within the area of an air bag deployment door. An air bag chute extends downward from the support base and contains a plurality of skirt walls for defining a path for deployment of an air bag from beneath the substrate. A hinge element extends from one of the skirt walls to one edge of the door support panel wherein the hinge element has upper and lower surfaces joined by a left side surface and a right side surface. At least one of the side surfaces protruding from the skirt wall includes an undercut so that a lower corner of the hinge element forms an obtuse angle, resulting in better transfer of deployment forces through the hinge element.

8 Claims, 5 Drawing Sheets

AIR BAG DEPLOYMENT DOOR WITH FORCE TRANSMITTING HINGE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to air bag deployment systems for automotive vehicles, and, more specifically, to a door support panel structure that has an energy transmitting hinge formed integral with an air bag chute.

Air bag deployment chute assemblies have been put into commercial use for the passenger side of an instrument panel of automotive vehicles. The chute assembly couples an air bag module (typically containing a folded bag and chemical propellants for inflating the bag on command) to a door support panel (i.e., substrate) of the instrument panel. A typical structure for a chute assembly includes a tubular outer wall, one or more door flaps, and one or more hinge members connecting the door flaps to the outer wall. The hinge can be formed with a dual curved configuration that allows the hinge to straighten out as the air bag is deployed.

In copending published application US2010/0109296A1, a hinge element is disclosed that extends between a skirt wall of the air bag chute tube and one edge of a door support panel, and that includes a pair of pivoting elements and an arm extension. A first pivoting element is formed with a downwardly directed curve having one end connected to the inner side of the skirt wall and the other end connected to the second pivot element. The second pivot element is formed with an upwardly directed curve having one end connected to the first pivot element and the other end connected to an extension arm that extends upwards to the edge of the door support panel. During deployment of the associated air bag, the integrated structure allows energy forces presented to the door support panel to be partially dissipated into the structure via the hinge element.

The air bag module is typically required to be mounted with its top edge in a horizontal plane so that the chemical reaction and air bag expansion can be properly directed and controlled. The door support substrate, however, is typically not horizontal. Instead, it usually slopes from the center of the vehicle toward the passenger side of the vehicle. Since the door flap(s) and hinge member(s) follow the shape of the door support substrate, they are also not horizontal. As a result, the deployment forces from the expanding air bag can create a torque on the hinge member that could impair the hinge operation or even cause breakage of the hinge which reduces the dissipation of energy into the skirt wall.

SUMMARY OF THE INVENTION

In one aspect of the invention, an air bag deployment apparatus is provided for use in an air bag deployment system of an automotive vehicle. The apparatus has a support base for attachment to a rear surface of an occupant facing substrate of the vehicle, wherein the support base has upper and lower surfaces and is configured to surround an air bag deployment door in the substrate defined by an area that is pre-weakened. A door support panel has upper and lower surfaces and four side edges for attachment to the rear surface of the substrate within the area of the air bag deployment door, wherein the door support panel is generally co-planar with the support base when attached to the rear substrate surface and all four side edges are separated from the support base along the rear substrate surface. An air bag chute extends downward from the support base and contains a plurality of skirt walls for defining a path for deployment of an air bag from beneath the substrate. A hinge element extends from one of the skirt walls to one edge of the door support panel wherein the hinge element has upper and lower surfaces joined by a left side surface and a right side surface. At least one of the side surfaces protruding from the skirt wall includes an undercut so that a lower corner of the hinge element forms an obtuse angle.

DETAILED DESCRIPTION OF PREFERRED EMBODIMENTS

Figure 1:
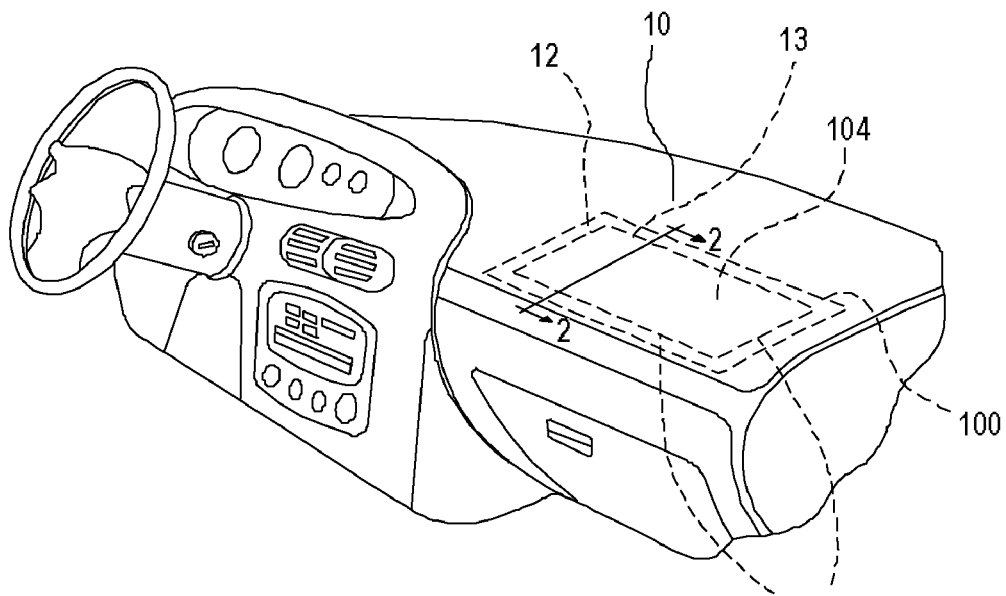
FIG. 1 is a perspective view of a vehicle instrument panel illustrating air bag deployment areas.

Referring to FIGS. 1-4, a vehicle instrument panel 10 receives an air bag deployment structure 100. A support base 101 is shown attached to the lower surface of a substrate 14 that forms part of the instrument panel 10. A door support panel 104 is shown as also attached to the lower surface of the substrate, but positioned below an air bag deployment door that is defined by pre-weakened door seam 12 and hinge seam 13.

Support base 101 is shown to have upper and lower surfaces. The upper surface of support base 101 contains a plurality of welding ribs 118 to facilitate attachment to the lower surface 11 of substrate 14 with a vibration welding process. (Of course other types of attachment such as ultrasonic welding, adhesives and other commonly known techniques may be acceptable substitutes, provided they preserve the energy absorbing characteristics described herein.) Door support panel 104 also contains welding ribs which are attached to the lower surface 11 of substrate 14 within an area defined as the air bag deployment door by the pre-weakened seams 12 and 13. In this configuration, the door tear seam 12 is pre-weakened to the extent that the outer surface of instrument panel 10 and the substrate 14 will completely rupture upon deployment of the air bag. Seam 13 is a hinge seam and is only required to provide a pivot point for the substrate and outer skin of the instrument panel 10. Therefore, it may be pre-weakened to a lesser extent than door seam 12.

Air bag deployment structure 100 is preferably formed as a one piece molding of a flexible material such as Dexflex™ or other material that exhibits good ductility at very cold temperatures at least to −30° C. and good toughness at high temperatures at least to 90° C. Other materials such as TPO (Thermoplastic Olefin), TPE (Thermoplastic Elastomer), or TEO (Thermoplastic Elastomer Olefin) could be used. Various pieces could be separately formed and joined together to replicate a one-piece molded component. If that is done, care will have to be made in order to obtain the energy management that is offered by the integration of the various elements that make up the disclosed structure.

Support base 101 is a generally planar flange that is substantially coplanar with door support panel 104. As shown in the figures, there is a slight curvature that is intended to correspond to the styled substrate surface to which the structure 100 attaches.

In the depicted embodiment, an alignment slot 137 is provided in an extension from support base 101. Although not shown, the substrate 12 may have a protrusion formed therein and extending from its lower surface to provide a keying feature to be received in slot 137 in order to assist in the placement of the support structure 100 prior to being welded to the substrate. Apertures on tabs 131, 133, and 135 extending from support base 101 are used to perform the same function as alignment slot 137 with protrusions extending from the lower surface of substrate 12.

A test tab extension 139 is shown as having deformable ribs 136 that are is identical in content to weldable ribs 118 on support base 101 for attachment to the corresponding lower surface area of the substrate 12 during the same vibration welding process. The test tab extension 139 allows the welding vendor or subsequent customer to perform non-destructive quality control testing by applying a pull pressure to the tab and thereby ensure that the entire weld of the support structure 100 to the substrate is acceptable.

Door support panel 104 and support base 101 are separated by a gap 112 so that door support panel 104 is not directly attached to the support base 101. The support base 101 extends under the pre-weakened door seams 12 and 13 and therefore provides resistance to inward pressures that may be applied to the outer surface of the instrument panel. In the depicted embodiment, several apertures 110 are shown in door support panel 104. Apertures 110 are positioned to reduce the mass of the door support panel 104 without affecting its support or attachment properties.

An air bag chute tube is formed by skirt walls 105, 106, 107, and 108 which extend downward from support base 101. In this embodiment, the air bag chute tube has a substantially rectangular configuration defined by side skirt walls 105 and 107 and front and back skirt walls 106 and 108. Angle gussets such as 128 are spaced along the skirt walls to provide added strength and some rigidity between the support base 101 and the air bag chute tube.

A hinge element 200 extends between skirt wall 108 and hinge edge 109 of door support panel 104. Hinge element 200 includes respective first and second pivoting elements "A" and "B" and an arm extension 103. From the end, it can be seen that the first pivoting element A is formed with a downwardly directed curve having one end connected to the inner side 111 of side skirt wall 108 and the other end connected to the second pivot element B. The second pivot element B is formed with an upwardly directed curve having one end connected to the first pivot element A and the other end connected to extension arm 103. Extension arm 103 extends upwards from second pivot element B to hinge edge 109 of the door support panel 104. Each pivot element is an axial extension substantially parallel to each other and to the edge of the door panel to which the arm extension 103 is connected. Each pivot element, as well as arm extension 103, extends approximately the full length of the hinge edge 109.

The longer side skirt walls 106 and 108 contain several window apertures 114 and 116 for engagement with a corresponding number of attachment hooks 304 and 306 extending from an air bag container 300. Each window aperture 114 and 116 has a tab 115 and 117 that bear against the inserted hooks to tighten the engagement connections and prevent rattling from occurring between the air bag container and the air bag chute during vehicle operation prior to air bag deployment.

The lower portions of the side skirt walls 106 and 108 (below the windows 114 and 116) contain reinforcement barriers 122 and 124. Reinforcement barriers 122 and 124 are formed as a doubled thickness of the side skirt wall material and are formed along the entire length of side skirt walls 106/108. Reinforcement barriers act to prevent hooks 304 and 306 from completely tearing through the side skirt walls from their positions in the windows 114 and 116 when the air bag is deployed. When an air bag is deployed, there is severe pressure initially present from a gas canister 305 within the air bag container and chute. Because the air bag container 300 is fixed to the structure of the vehicle at mounting structure 307, the hooks 304 and 306 prevent separation of the air bag support structure 100 and the instrument panel from their intended locations during air bag deployment. Hooks 304 and 306 interact with side skirt walls 106 and 108 below the windows 114 and 116 to contain the pressure and allow the chute to remain intact and direct the pressure to the door support panel 104, which will force rupturing of the tear seams 12 and allow the air bag to deploy. Some prior art applications use metal side walls in air bag chutes to prevent tearing. In the present inventive concept where a thermoplastic material, such as noted above, is molded to form an integrated structure 100, the double thickness reinforcement barriers 122 and 124 function to prevent the hooks from completely tearing through and allowing separation of the air bag support structure.

Figure 5:
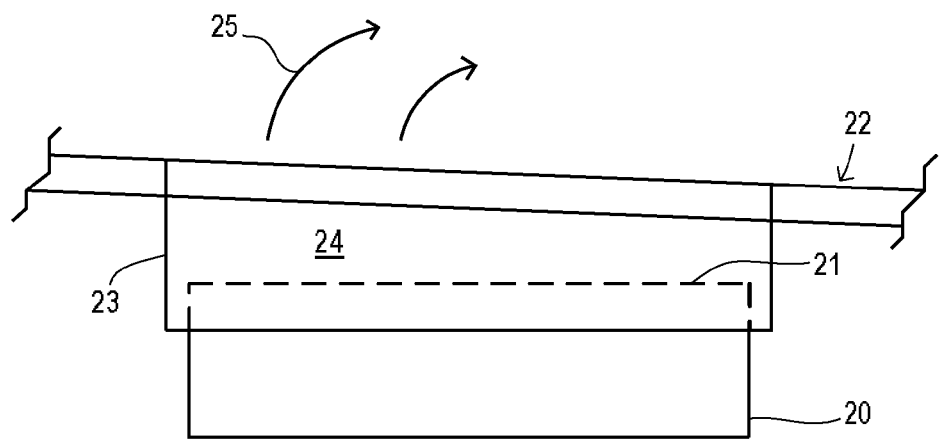
FIG. 5 is diagram showing uneven deployment forces.

Referring to FIG. 5, an air bag container 20 has a top edge 21 that must be maintained horizontal for proper operation. An upper instrument panel surface 22 is typically not horizontal since a typical instrument panel is styled to be highest along a center line of the vehicle and to slope downward toward the driver's side and passenger's side of the vehicle. An air bag chute 23 attaches to container 20 and instrument panel 22 in a manner that accommodates for the difference in height at each end of container 20. Upon deployment of the air bag, the inflating air bag fills a space 24 within the interior of chute 23. As space 24 is filled with the expanding air bag such that a substantially equally rising pressure is present throughout space 24, a sideways rotational torque 25 may result since one side of the deploying air bag extends to a higher elevation along the sloped inner surface of instrument panel 22 thereby causing uneven deployment forces. Torque 25 has a pivot axis that is perpendicular to the axis of the hinge element. Torque 25 is undesirable as it could create a tear along the hinge element where it attaches the air bag door to the chute.

Figure 6A:
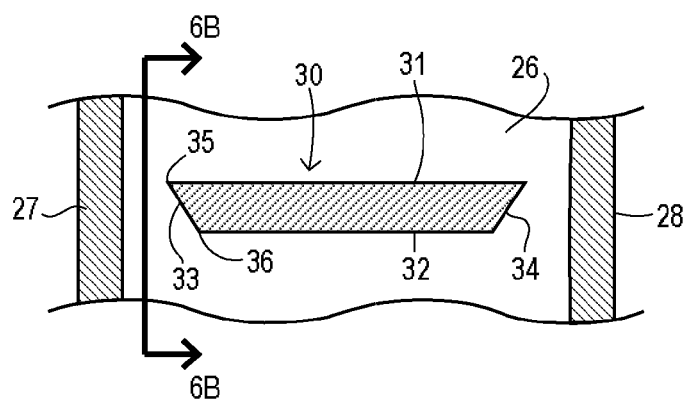
FIG. 6A is a front plan view of a generic example of an undercut hinge according to one embodiment of the present invention.

The present invention handles the uneven forces by applying a special undercut at the end of the hinge experiencing the torque forces (i.e., the hinge corresponding to the higher end of the instrument panel substrate, as shown in FIG. 6A. In an integrally molded plastic unit, a hinge 30 protrudes from a skirt wall 26 of an air bag chute between skirt walls 27 and 28. Where it emerges from skirt wall 26, hinge 30 has an upper surface 31 and a lower surface 32 joined by a left side surface 33 and a right side surface 34. Both side surfaces 33 and 34 are shown with an undercut even though the increased torque forces would be applied only to one side surface. For purposes of standardizing design practices, facilitating mold design, and maintaining design flexibility, it is desirable to provide the undercut on both side surfaces. However, only the side surface corresponding to the end where the instrument panel is highest needs to have an undercut.

Figure 6B:
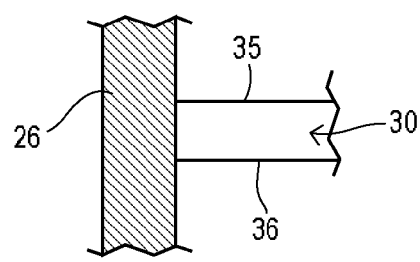
FIG. 6B is side view taken along section line 6B-6B in FIG. 6A.

The top of left side surface 33 is defined by an upper cusp 35 extending away from skirt wall 26 as shown in FIG. 6B. The bottom edge of side surface 33 provides a lower cusp 36. According to the present invention, the undercut is comprised of an obtuse angle (i.e., greater than 90°) of the side surface with respect to is the bottom surface. Thus, the angle at lower cusp 36 is greater than 90°. The obtuse angle is preferably in the range of about 100° to about 150°, and more preferably within the range of about 115° to about 135°.

Figure 2:
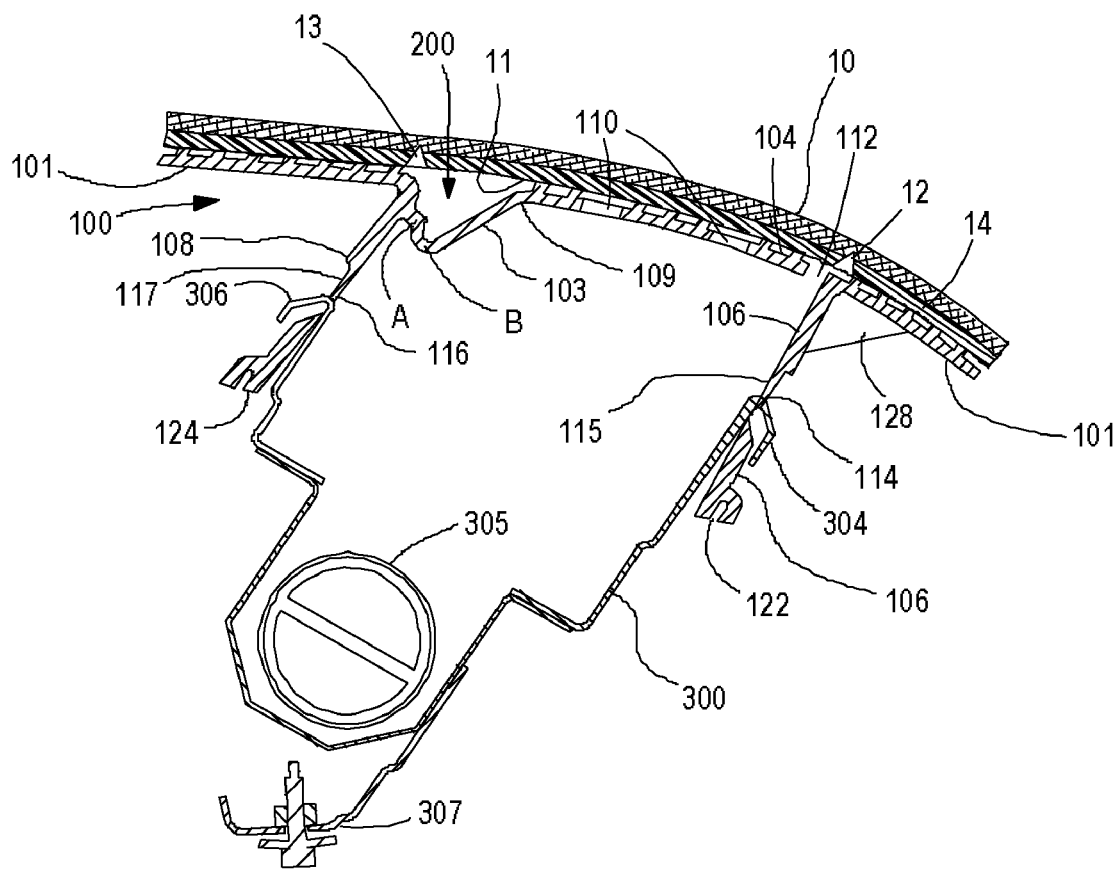
FIG. 2 is a cross-sectional view of an air bag system having a chute connected to a substrate.
Figure 3:
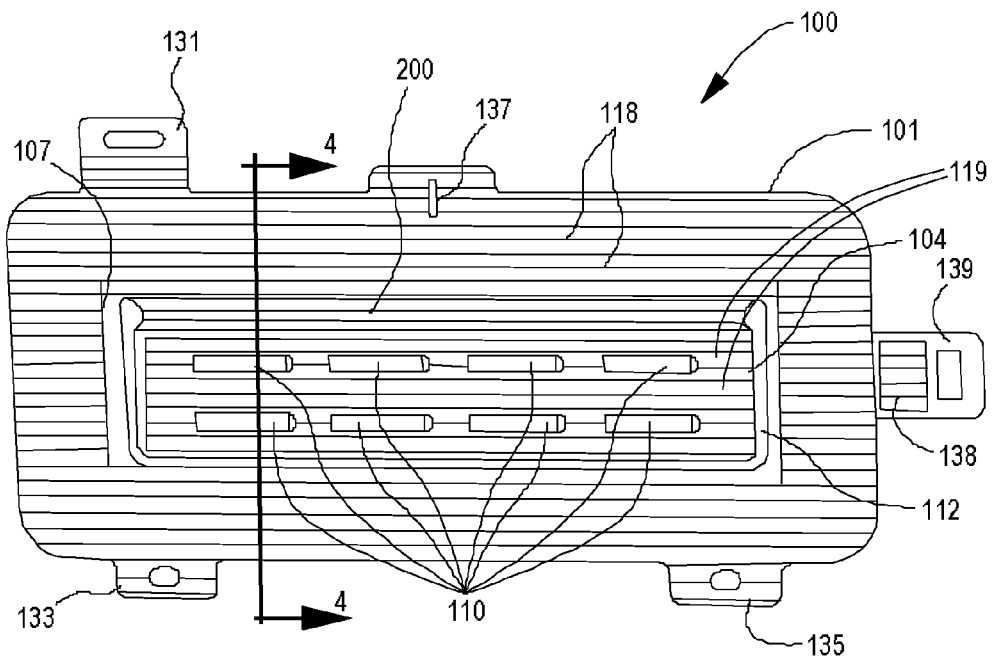
FIG. 3 is a top plan view of an embodiment of the air bag deployment apparatus with chute prior to installation in a vehicle.
Figure 4:
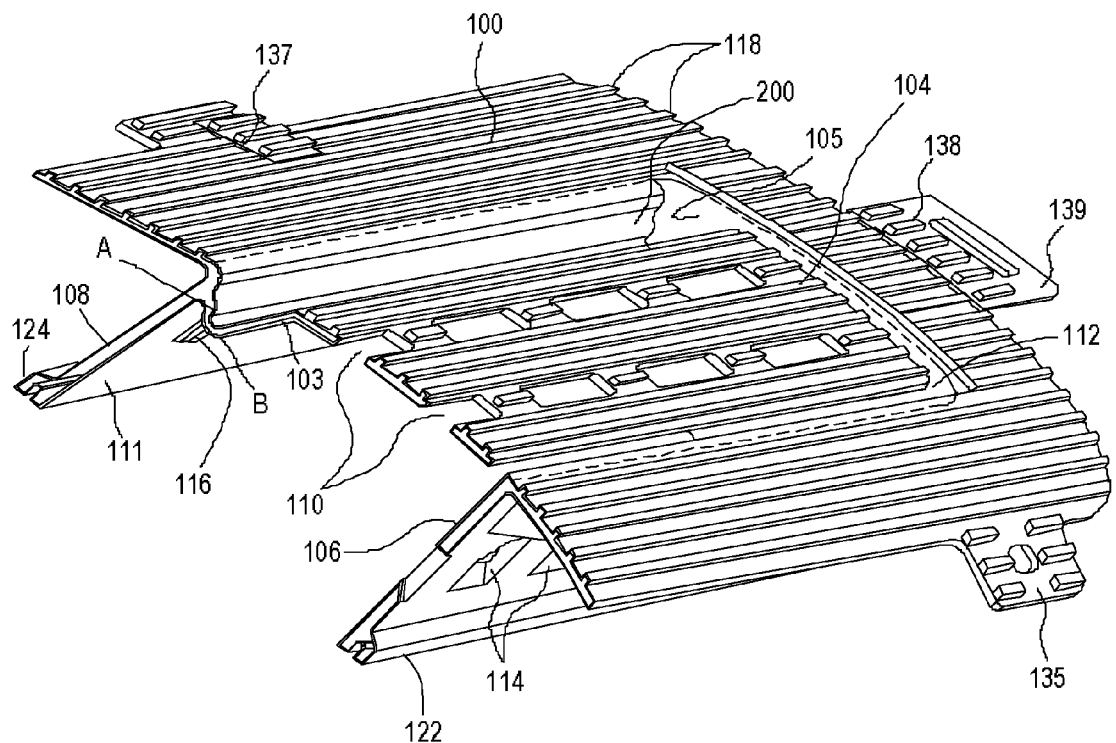
FIG. 4 is a cross-sectional perspective view taken along section line 4-4 in FIG. 3.
Figure 7:
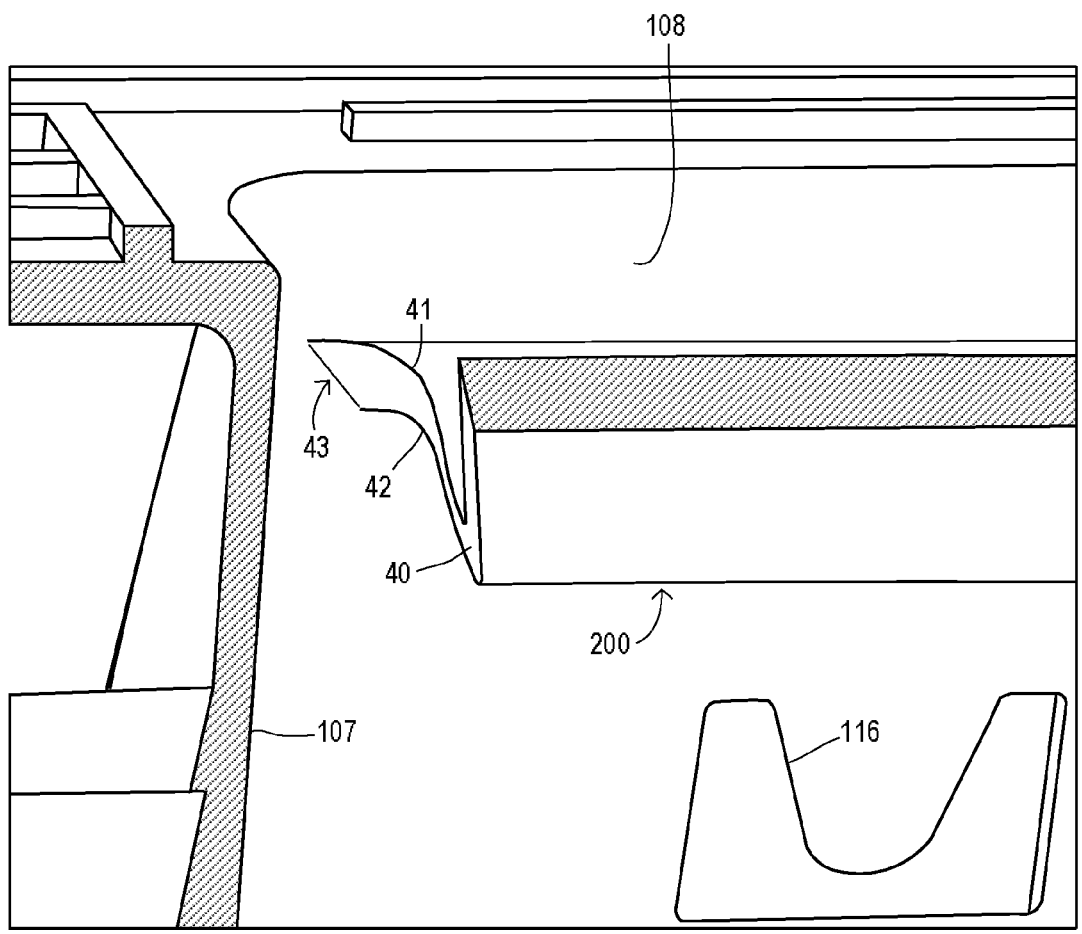
FIG. 7 is a partial sectional view of an undercut hinge of another embodiment.
Figure 8:
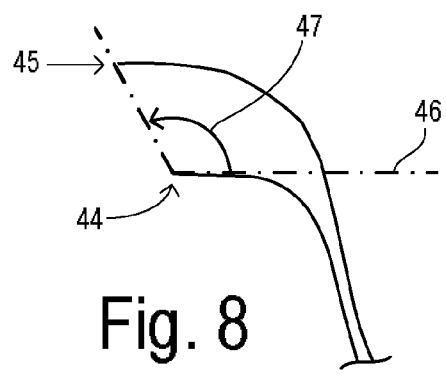
FIG. 8 illustrates the obtuse angle of the embodiment of FIG. 7.

FIG. 7 shows the present invention used with a hinge element 200 having pivot elements of FIGS. 2-4. Where hinge element 200 protrudes from skirt wall 108, it has an undercut side surface 40 between an upper cusp 41 and a lower cusp 42. Due to the undercut, side surface 40 emerges from skirt wall 108 at an obtuse angle shown at 43. As shown in FIG. 8, a lower left corner 44 of the side surface coincides with the lower cusp 42. An imaginary line 45 passes through point 44 and an upper left corner where the side surface emerges from the skirt wall. An imaginary line 46 coincides with point 44 and the bottom surface of the hinge element. An angle 47 between imaginary lines 45 and 46 forms an obtuse angle. The obtuse angle provides an increased amount of material at the base of the hinge element for transmitting forces in a manner that provides greater resistance to tearing of the hinge element. As a result, the uneven deployment forces are better transferred to the skirt wall and the integrity of the hinge element is maintained.

Figure 9:
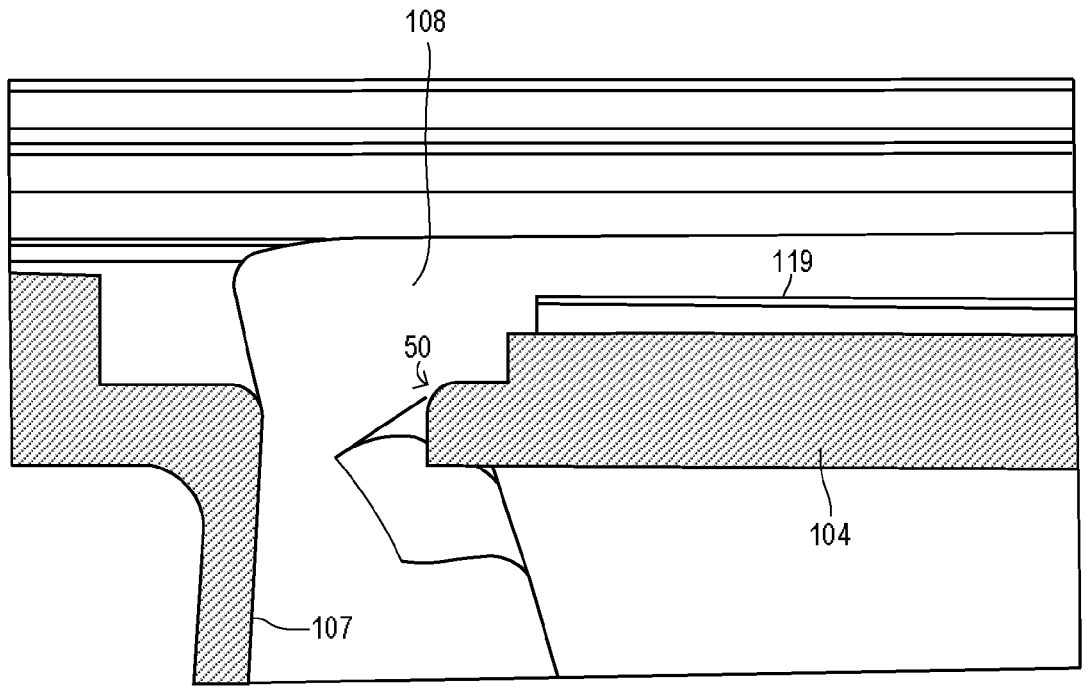
FIG. 9 is another partial cross sectional view of the undercut hinge of FIG. 7 taken at a position farther from the skirt wall.
Figure 10:
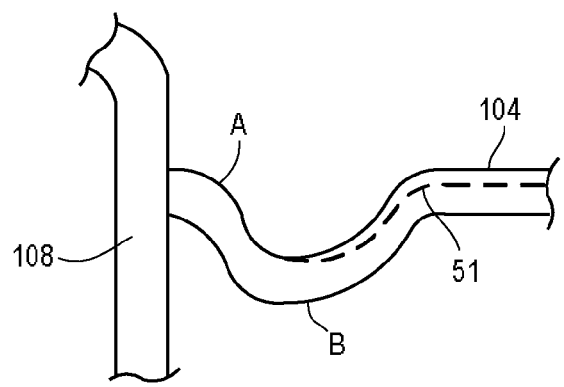
FIG. 10 is a side view showing a varying position of a parting line for another embodiment of the invention.

To best utilize the added material from the undercut toward the top surface of the hinge element, the side surface preferably terminates with an acute edge at the upper cusp. However, maintaining a sharp edge at the upper cusp along the entire side surface of the hinge may be undesirable since it would provide a place where the air bag could bind during inflation. As shown in FIG. 9, a radius 50 may be provided in the upper cusp for portions of the hinge element away from skirt wall 108. In connection with an integrally molded part, the parting line (corresponding to the break in the mold tooling used to manufacture the part) preferably coincides with the upper cusp at the point where it emerges from the skirt wall. As shown in FIG. 10, with increasing distances away from skirt wall 108, a parting line 51 transitions from the upper cusp toward the lower cusp with increasing distance from skirt wall 108 so that the radius as shown in FIG. 9 is achieved at or prior to the point where the parting line reaches door support panel 104.

What is claimed is:

1. An air bag deployment apparatus for use in an air bag deployment system of an automotive vehicle, comprising:
   a support base for attachment to a rear surface of an occupant facing substrate of the vehicle, the support base having upper and lower surfaces and being configured to surround an air bag deployment door in the substrate, the air bag door being defined by an area that is pre-weakened;
   a door support panel having upper and lower surfaces and four side edges for attachment to the rear surface of the substrate within the area of the air bag deployment door, wherein the door support panel is generally co-planar with the support base when attached to the rear substrate surface and all four side edges are separated from the support base along the rear substrate surface;
   an air bag chute extending downward from the support base and containing a plurality of skirt walls for defining a path for deployment of an air bag from beneath the substrate; and
   a hinge element extending from one of the skirt walls to one edge of the door support panel wherein the hinge element has upper and lower surfaces joined by a left side surface and a right side surface, wherein at least one of the left and right side surfaces protruding from the skirt wall includes an undercut so that a lower corner of the hinge element where it emerges from the one of the skirt walls forms an obtuse angle.

2. The apparatus of claim 1 wherein the obtuse angle is in the range of about 100° to about 150°.

3. The apparatus of claim 1 wherein the obtuse angle is in the range of about 115° to about 135°.

4. The apparatus of claim 1 wherein the undercut side surface has an upper cusp and a lower cusp, and wherein at least a portion of the upper cusp has a radius in order to reduce binding of the air bag at the hinge element during inflation.

5. The apparatus of claim 1 wherein the air bag chute and the hinge element are integrally molded, wherein the undercut side surface has an upper cusp and a lower cusp, and wherein the hinge element is formed with a parting line that coincides with the upper cusp where the undercut side surface emerges from the skirt wall.

6. The apparatus of claim 5 wherein the parting line transitions from the upper cusp toward the lower cusp with increasing distance from the skirt wall.

7. The apparatus of claim 1 wherein both side surfaces protruding from the skirt wall include an undercut so that each respective lower corner of the hinge element forms an obtuse angle.

8. An airbag chute comprising:
   a support base;
   a door panel;
   an air bag chute extending from the support base and having a skirt wall; and
   a hinge element extending from the skirt wall to the door panel and having upper and lower surfaces joined by left and right side surfaces, wherein one left and right side surfaces includes an undercut whereby a lower corner of the hinge element emerging from the skirt wall forms an obtuse angle.

* * * * *